(No Model.)
F. WARD.
TIRE UPSETTER.
No. 546,721.  Patented Sept. 24, 1895.
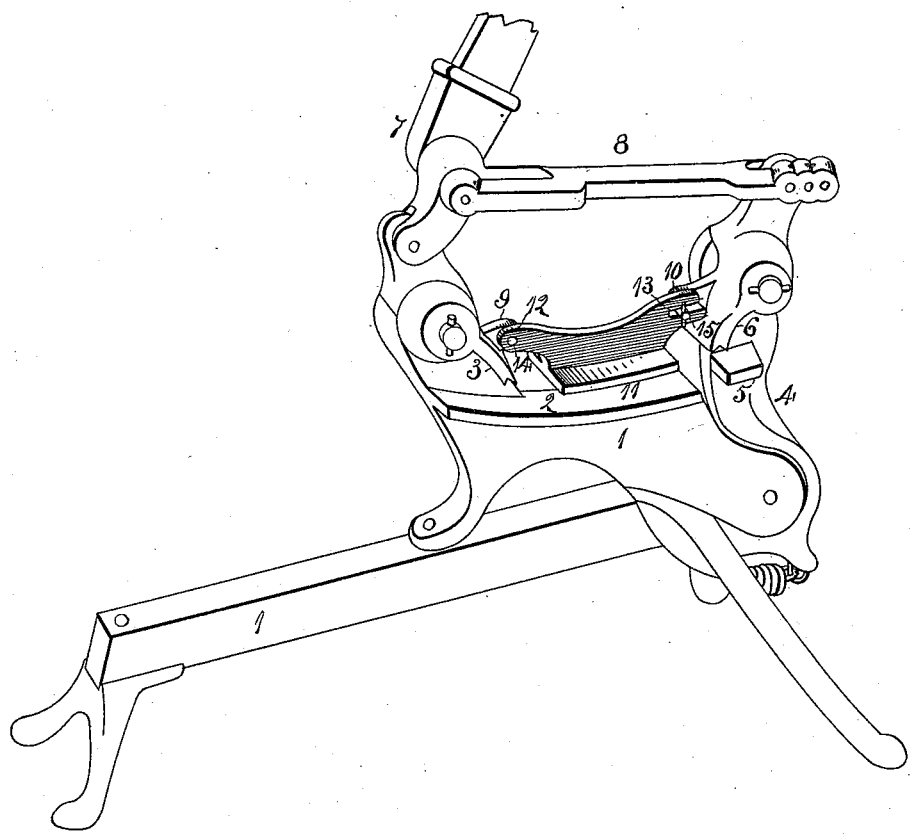
Witnesses:
J. Sovereign
E. Behel.
Inventor:
Frank Ward
By A. O. Behel
Atty.

UNITED STATES PATENT OFFICE.

FRANK WARD, OF ROCKFORD, ILLINOIS.

TIRE-UPSETTER.

SPECIFICATION forming part of Letters Patent No. 546,721, dated September 24, 1895.

Application filed July 30, 1895. Serial No. 557,629. (No model.)

*To all whom it may concern:*

Be it known that I, FRANK WARD, a citizen of the United States, residing at Rockford, in the county of Winnebago and State of Illinois, have invented certain new and useful Improvements in Tire-Upsetters, of which the following is a specification.

The object of this invention is to prevent buckling or kinking of the tire while being upset.

In the accompanying drawing I have shown a perspective view of a tire-upsetter to which my improvements are attached.

The tire-upsetter shown in the drawing in the main is of an old construction, to which my improvements have been attached, and consists of the main supporting-frame 1, having a ledge 2 and supporting a dog 3, and an end 4, pivotally connected to the main frame, having a ledge 5, and supporting a dog 6. A hand-lever 7 has a pivotal connection with the dog 3, and a link 8 connects this hand-lever with the dog 6. From the dog 3 extends a lug 9, and from the dog 6 extends a lug 10. A shoe 11 has one end 12 perforated and its other end provided with a lengthwise slot 13. The perforated end is placed over a stud 14, extending from the lug 9, and a stud 15, extending from the lug 10, is located in the lengthwise slot 13. The shoe is located over the ledge 2 of the main frame. The tire to be upset is placed upon the ledges beneath the shoe. By means of the handle-lever the dogs may be turned upon their pivotal supports and brought in contact with the tire. This movement of the dogs will lower the shoe in contact with the tire and hold it in this position during the upsetting process, and it will be elevated upon the elevation of the dogs. The lengthwise slot 13 permits of the separation of the dogs without becoming disengaged from the shoe. It will be noticed that the shoe is supported entirely by the dogs and has no connection with other parts of the upsetter.

I claim as my invention—

In a tire upsetter, the combination of a suitable frame, a support for the tire, two pivoted dogs, a hand lever pivotally connected with one of the dogs, a link pivotally connected at one end to the other dog, and at its other end to the hand lever, a shoe overlying that portion of the tire located between the dogs having a pivotal connection with one of the dogs, and a movable connection with the other dog.

FRANK WARD.

Witnesses:
 A. O. BEHEL,
 E. BEHEL.